Sept. 5, 1967    N. A. GRANITO ET AL    3,340,220
PROCESS FOR TREATING GLASS FIBER AND MINERAL
FILLER FILLED POLYESTER RESINS
Filed April 14, 1964

INVENTORS.
NICHOLAS AUGUST GRANITO
JOHN ALBERT ARNONE, JR.
BY
James T. Dunn
ATTORNEY 3,340,220
PROCESS FOR TREATING GLASS FIBER AND MINERAL FILLER FILLED POLYESTER RESINS
Nicholas August Granito, Wallingford, and John Albert Arnone, Jr., North Haven, Conn., assignors to American Cyanamid Company, Stamford, Conn., a corporation of Maine
Filed Apr. 14, 1964, Ser. No. 359,621
3 Claims. (Cl. 260—40)

ABSTRACT OF THE DISCLOSURE

A process for treating a polyester resin composition containing a finely divided mineral filler dispersed in an inert solvent and containing glass fibers comprising passing said filled composition in a fluid state between a pair of pin studded rolls moving counter-rotationally wherein said rolls have differing speeds resulting in a net tip speed between about 30 ft./min. and 800 ft./min. and recovering and drying the treated product wherein the viscosity of the finely divided mineral filler filled polyester resin composition has a viscosity of less than 25,000 centipoises.

This invention relates to a shredding machine for use in the treatment of glass fiber-filled unsaturated polyester resin molding compositions and to the process for treating a glass fiber-filled unsaturated polyester resin. Still further, this invention relates to a process for treating glass fiber-filled polyester resin molding compositions so as to achieve a more uniform distribution of the glass fibers without any significant attrition of said fibers and thereby enhancing the drying and handling properties of the treated composition, without degrading the properties of the ultimately molded article.

One of the objects of the present invention is to produce a shredding machine which has utility primarily in the field of treating glass fiber-filled unsaturated polyester resins so as to convert the filled resins to molding compositions having enhanced uniformity and handling properties without degrading the properties of the ultimately molded article. A further object of the present invention is to process glass fiber-filled polyester resin compositions so as to convert them into a more readily handled molding composition. These and other objects of the present invention will be discussed in greater detail hereinbelow.

Unsaturated polyester resin compositions have been marketed in a filled state as molding compositions for a number of years. These unsaturated polyester resins are prepared by reacting an $\alpha,\beta$-ethylenically unsaturated dicarboxylic acid with a glycol and preferably additionally with a polycarboxylic acid free of non-benzenoid unsaturation until a comparatively low acid number is reached. These unsaturated polyester resins are then blended with a suitable cross-linking agent namely a polymerizable monomer having a boiling point of at least 60° C. such as styrene, diallyl phthalate and the like. These polyester resin compositions are well-known in the art as illustrated by the U.S. Patents 2,255,313, 2,443,735–41, inclusive, among a host of others. In order to avoid any unnecessary redundancy, these cited references are incorporated herein by reference. These patents illustrate specifically the types of $\alpha,\beta$-ethylenically unsaturated dicarboxylic acids, the polycarboxylic acids free of non-benzenoid unsaturation and the glycols which may be used in the preparation of the polyester resin per se and also illustrate in a substantial plurality of specific details, the polymerizable monomers which are used with the unsaturation polyester resins as cross-linking agents. Additionally, these references disclose the use of other standard additives such as inhibitors, catalysts, promoters, mold lubricants, fillers, coloring matters such as dyes and pigments, and the like. Among the fillers used in the unsaturated polyester resin molding compositions, are the inorganic mineral fillers such as finely divided calcium carbonate, glass fibers, asbestos fibers, talc, clay and the like. Ultraviolet light absorbers are also used sometimes such as the hydroxy substituted benzophenones of which a plurality are available commercially including some of those disclosed in the U.S. Patent 2,777,828.

In the category of inhibitors, against premature cross-linking on storage, are the aryl hydroxides and particularly the substituted aryl hydroxides as disclosed in the U.S. Patent 2,632,751.

The composition of the present invention as introduced into the apparatus preparatory to processing, is disclosed in the U.S. Patent 2,819,243. The particular manner of mixing the respective ingredients as disclosed and claimed in said patent may readily be used to prepare the starting materials of the present invention, although other alternative techniques may also be used. Following the general outline of the above-mentioned patent, one would add to a mixture of a polymerizable unsaturated polyester resin and a finely divided mineral filler, a suitable solvent in a quantity sufficient to produce liquid having a viscosity of less than 25,000 centipoises. The solvent is preferably an inert solvent such as methylene chloride. To the thus prepared blend, there is added a small but effective amount of a polymerization catalyst followed by the addition of glass fiber strands of about ¼ inch to 2 inches in length, each strand being composed of a multiplicity of individual untwisted glass fibers having a diameter between about 0.0001″ and 0.001″. The total composition is then mixed by a comparatively gentle mixing operation which distributes the bulk of the strands without substantial intermeshing thereof and which mixing does not abrade substantially the surface of the fibers. When this mixing operation has been accomplished, the fibers must then be further distributed throughout the product mass, rearranged to give large interstitial voids, while suffering no damage in the process. This is accomplished in this invention by use of the shredder. The product discharged from the shredder is in the desired physical form and is more amenable to greatly increased rates in the subsequent drying operation. The preservation of ultimately molded article properties is an essential feature of the shredder treatment, such as the impact strength values.

The apparatus of the present invention accomplishes this distribution of fibers with little or no damage to the fibers per se and yet permits the metering of the product to be treated as it is being fed to the shredder rolls. In order to achieve the desired measure of shredding, the apparatus of the present invention is designed so that the parallel pin studded shredder rolls operate at differential speeds in a counter-rotational direction. The shredder rolls are preferably of substantially the same diameter although they may be of substantially different diameters if desired. It is preferably and more accurate to define the speed differential in terms of net tip speed of the two shredder rolls. The net tip pin speed is determined by subtracting the product of the circumference and the revolutions per minute of one roll from the product of the circumference and the revolutions per minute of the other roll. The net tip speed, therefore, may be varied between about 30 and 800 ft. per minute and preferably from about 400 to 500 ft. per minute. For optimum results a net tip speed of 450 ft. per minute should be used. The use of these preferred and optimum speeds permits the production of a desired uniform product with substantially no break down of the fibers. Speeds outside this range will give other product forms, which may also be desirable.

The brushes, mounted beneath the shredder rolls, are designed to clean the shredder rolls as much as possible by removing particles of the filled polyester resin composition from the pins and the interstices both vertically and laterally. The brushes may contact the pins or may be adjusted so as to contact the actual cylinder carrying the pins or any intermediate position. These brushes generally are operated at a uniform speed with respect to one another and may vary in speed between about 800 and 1500 ft. per minute as a tip speed. The preferred brush tip speed would be about 1100–1200 ft. per minute. When the slower speeds are used, the brush fails to remove as much of the adherent slightly tacky molding composition from and between the pins but the brush life expectancy is significantly enhanced. On the other hand, the higher speeds of the brushes remove substantially all of the molding composition but the life expectancy of the brushes at the higher speeds is significantly diminished. Still further, in using the higher brush speeds, bristles from the brush sometimes become mixed with the molding composition which may or may not be detrimental. If the brush bristles are a natural fiber or a synthetic polymer fiber such as nylon, the presence of such bristles in the ultimate product could well have no adverse effect. However, if the bristles of the brushes are steel wires, the mixing through inadvertence of such steel wires in the molding composition can have a detrimental effect, particularly if the molding composition is to be used in an electrical insulating molded article. However, automatic inspection via a metal detection device could detect and remove the contamnated portion of the resin composition. When the molding composition is to be used for non-electrical purposes, such precautions need not necessarily be taken since the metallic contaminants may not be undesirable.

Reference is made to the accompanying drawing which illustrates in greater detail the shredding machine of the present invention.

Figure 1:
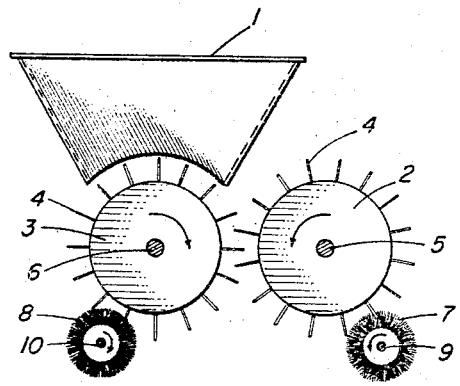
FIG. 1 is a side elevational view of the shredding machine of the present invention.
Figure 2:
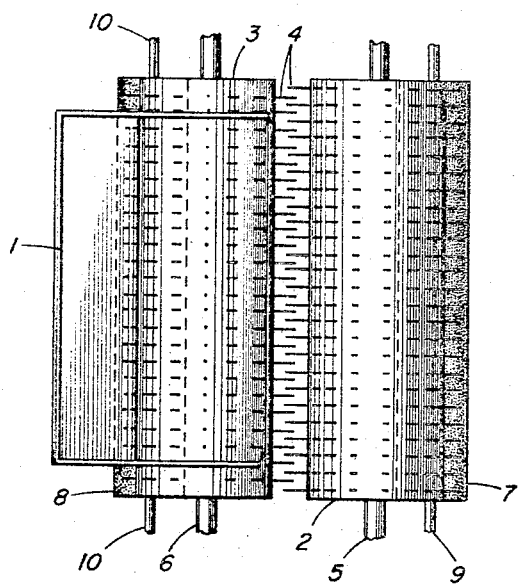
FIG. 2 is a top elevational view partly in section.

In each of the figures, 1 is the hopper into which the material to be treated is introduced. Immediately below the hopper 1 is the slow shredder roll 3 mounted on the axle 6. The companion fast shredder roll 2 is mounted on the axle 5. Extending radially from each of the rollers 2 and 3, are the shredder pins 4 which are so positioned on each of their respective rolls so as to intermesh as seen more clearly from the top elevational view, especially where the hopper has been cut away for better viewing. Beneath the slow roller 3 and the fast roller 2 and in contact therewith, are the brushes 8 and 7, respectively, mounted on the axles 10 and 9, respectively.

The entire assembly is mounted on a structural frame (not shown) and the power mechanisms driving the rolls 2 and 3 and brushes 8 and 7 are also not shown. The rolls 2 and 3 are mounted horizontally on a structural frame and are driven counter-rotationally by a suitable power source or sources as an electric motor and/or an electric motor and transmission. A rectangular hopper 1 is situated above the slow roll and adjusted to a given clearance. Each of these shredder rolls 2 and 3 has a cylindrical brush 7 and 8, respectively, mounted below the shredder rolls and enmeshing with its companion roll, so that all four components are parallel to one another. The brushes 7 and 8 are driven independently of the shredder rolls using a second power source such as an electric motor also not shown.

In order that the process of the present invention may be more completely understood, the following example is set forth in which all parts are parts by weight unless otherwise indicated. This example is presented primarily for the purpose of illustration and specific enumeration of detail contained therein, should not be interpreted as a limitation on the case except as is indicated in the appended claims.

Example 1

Seventy parts by weight of a commercially available unsaturated polyester resin, prepared by reacting maleic anhydride, phthalic anhydride and ethylene glycol to an acid number of of about 15, is blended with about 30 parts by weight of diallyl phthalate, to which the usual inhibitors and peroxide catalysts are incorporated in their conventional amounts. About 30% by weight of china clay and 10% by weight of finely ground barium carbonate are added and thoroughly blended in. Sufficient quantities of methylene chloride are added so as to reduce the viscosity of the total composition to about 50–100 centipoises. The total composition is introduced into a slowly revolving Hobart mixer in order to prepare for the addition of the glass strands. About 80% by weight of the glass fibers measuring between about ½–2″ in length are incorporated into the resinous composition in the mixer. The mixing of the fibers into the resinous solution is continued, whereupon the fluid composition is removed from the mixer and passed through the shredding machine of the present invention at a net tip speed of about 450 r.p.m. On removal from the shredding machine, the treated mix is dried at 120° F. for one hour to remove the methylene chloride. At the end of that period, the product was ready for use as a molding composition. (All percentages by weight being based on the total weight of the polyester and monomer.)

Comparative Example 2

Example 1 is repeated in all essential details except that after the mixing of the glass fibers into the resinous solution in the Hobart mixer, the mixture is sent directly to the drying chamber instead of being passed through the shredding machine. The drying conditions were identical in each instance, namely, a temperature of 120° F. with equal bed thicknesses and equal oven recirculation rates. The unshredded material required 3 hours in which to dry.

We claim:

1. A process for treating a glass fiber and finely divided mineral filler filled polyester resin composition dispersed in an inert solvent comprising passing said composition in a fluid state at a viscosity of less than 25,000 centipoises between a pair of pin studded rolls moving counter-rotationally wherein said rolls have differing speeds resulting in a net tip speed between about 30 ft./min. and 800 ft./min., recovering and drying the treated product.

2. A process for treating a glass fiber and finely divided mineral filler filled polyester resin composition dispersed in an inert solvent comprising passing said composition in a fluid state at a viscosity of less than 25,000 centipoises between a pair of pin studded rolls moving counter-rotationally wherein said rolls have differing speeds resulting in a net tip speed between about 400 ft./min. and 500 ft./min., recovering and drying the treated product.

3. A process for treating a glass fiber and finely divided mineral filler filled polyester resin composition dispersed in an inert solvent comprising passing said composition in a fluid state at a viscosity of less than 25,000 centipoises between a pair of pin studded rolls moving counter-rotationally wherein said rolls have differing speeds resulting in a net tip speed of about 450 ft./min., recovering and drying the treated product.

References Cited

FOREIGN PATENTS 735,001   5/1966   Canada.

JULIUS FROME, *Primary Examiner.*

ROBERT C. RIORDON, MORRIS LIEBMAN,
*Examiners.*

D. KELLY, L. T. JACOBS, *Assistant Examiners.*